US009214701B2

(12) United States Patent
Nishimura et al.

(10) Patent No.: US 9,214,701 B2
(45) Date of Patent: Dec. 15, 2015

(54) LITHIUM-ION RECHARGEABLE BATTERY

(75) Inventors: Katsunori Nishimura, Hitachiota (JP); Yoshiaki Kumashiro, Kasama (JP); Kazushige Kohno, Hitachi (JP); Toshiyuki Kobayashi, Tokai (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 231 days.

(21) Appl. No.: 13/877,621

(22) PCT Filed: Aug. 19, 2011

(86) PCT No.: PCT/JP2011/068773
§ 371 (c)(1),
(2), (4) Date: Apr. 3, 2013

(87) PCT Pub. No.: WO2012/046513
PCT Pub. Date: Apr. 12, 2012

(65) Prior Publication Data
US 2013/0202957 A1    Aug. 8, 2013

(30) Foreign Application Priority Data
Oct. 5, 2010   (JP) ................... 2010-225313

(51) Int. Cl.
*H01M 10/0525* (2010.01)
*H01M 10/0563* (2010.01)
(Continued)

(52) U.S. Cl.
CPC .......... *H01M 10/0563* (2013.01); *H01M 4/131* (2013.01); *H01M 4/133* (2013.01);
(Continued)

(58) Field of Classification Search
CPC ................................ H01M 10/0567
USPC ................................ 429/121–347
See application file for complete search history.

(56) References Cited

U.S. PATENT DOCUMENTS 3,928,067 A * 12/1975 Broadhead et al. ........... 429/338
7,108,944 B2   9/2006 Kweon et al.
(Continued)

FOREIGN PATENT DOCUMENTS

JP      9-265984 A     10/1997
JP      2000-277146 A  10/2000
(Continued)

OTHER PUBLICATIONS

Minami et al. JP 2007-280918. Oct. 25, 2007. English machine translation by JPO.*
(Continued)

*Primary Examiner* — Kenneth Douyette
*Assistant Examiner* — James Lee
(74) *Attorney, Agent, or Firm* — Crowell & Moring LLP

(57) ABSTRACT

Provided is a technique of achieving a longer-life lithium ion secondary battery. The lithium ion secondary battery includes a cathode including a cathode active material containing Mn, an anode including an anode active material containing graphite and non-aqueous electrolytic solution including electrolyte, and $LiBF_4$ and $LiPF_6$ are allowed to coexist in the non-aqueous electrolytic solution. Especially preferably $LiPF_6$ is contained more than $LiBF_4$ in the electrolytic solution. Preferably the electrolytic solution further includes iodide salt. As a result, an oxide of phosphor and boron is deposited on the cathode, thus preventing elution of Mn included in the cathode. The amount of these electrolytes is preferably in the decreasing order of phosphor, boron and then iodine.

12 Claims, 4 Drawing Sheets

(51) Int. Cl.
*H01M 4/131* (2010.01)
*H01M 4/133* (2010.01)
*H01M 4/505* (2010.01)
*H01M 4/587* (2010.01)
*H01M 10/0567* (2010.01)
*H01M 10/0569* (2010.01)
*H01M 10/44* (2006.01)
*H01M 4/02* (2006.01)

(52) U.S. Cl.
CPC .............. *H01M 4/505* (2013.01); *H01M 4/587* (2013.01); *H01M 10/0525* (2013.01); *H01M 10/0567* (2013.01); *H01M 10/0569* (2013.01); *H01M 10/446* (2013.01); *H01M 2004/021* (2013.01); *Y02E 60/122* (2013.01); *Y02T 10/7011* (2013.01)

(56) References Cited

U.S. PATENT DOCUMENTS

| | | | |
|---|---|---|---|
| 7,316,865 | B2 | 1/2008 | Kweon et al. |
| 7,674,557 | B2 | 3/2010 | Sun et al. |
| 7,883,798 | B2 | 2/2011 | Kweon et al. |
| 2002/0119371 | A1* | 8/2002 | Haug et al. ............... 429/217 |
| 2005/0026043 | A1* | 2/2005 | Kang et al. ............... 429/330 |
| 2010/0266905 | A1 | 10/2010 | Jeon et al. |

FOREIGN PATENT DOCUMENTS

| | | |
|---|---|---|
| JP | 2002-175801 A | 6/2002 |
| JP | 2003-100296 A | 4/2003 |
| JP | 2003-234102 A | 8/2003 |
| JP | 2006-164527 A | 6/2006 |
| JP | 2007-280917 A | 10/2007 |
| JP | 2007-280918 A | 10/2007 |
| JP | 2008-146862 A | 6/2008 |
| JP | 2008-277307 A | 11/2008 |
| JP | 2009-123410 A | 6/2009 |
| JP | 2009-224097 A | 10/2009 |
| JP | 2010-539670 A | 12/2010 |

OTHER PUBLICATIONS

Chinese Office Action dated Sep. 24, 2014 (seven pages).
Brownstein "Reactions of tetrabutylammonium halides with boron trifluoride and phosphorus pentafluoride" National Research Council of Canada, Ottawa, Canada, Feb. 14, 1967, pp. 2403-2409, vol. 45, Canadian Journal of Chemistry.
Korean Office Action dated Jul. 21, 2014 (four (4) pages).
Corresponding International Search Report with English Translation dated Nov. 15, 2011 (five (5) pages).
Japanese-language Written Opinion dated Nov. 15, 2011 (PCT/ISA/237) (three (3) pages).

* cited by examiner

LITHIUM-ION RECHARGEABLE BATTERY

TECHNICAL FIELD

The present invention relates to a lithium ion secondary battery, and relates to a power supply and an equipment system including the same.

BACKGROUND ART

Lithium ion secondary batteries including a lithium ion secondary battery have a high specific energy density. As such, the development of these batteries for various purposes is expected, including the usage for electric vehicles and electricity storage.

For the various purposes, lithium ion secondary batteries are required to have a large output. A lithium ion secondary battery having a large capacity and output in the early stage may deteriorate in the capacity and the output because DC resistance (DCR) of the battery increases during the course of subsequent charge/discharge cycles or with the passage of time, and a system including such a lithium ion secondary battery cannot continue the operation in some cases. A cathode including an oxide mainly containing manganese has a prominent tendency of the DCR increase at the cathode related to Mn elution from the Mn oxide.

To avoid such a problem, a method has been examined to form a protective film on the cathode surface (Patents Literatures 1 to 6). Patent Literature 1 discloses a technique of treating a $LiMn_2O_4$ cathode active material with boric-acid, thus covering the surface with boron. Patent Literature 2 relates to the invention of forming a first cover layer containing a boron oxide and a second cover layer containing a lithium-cobalt composite oxide on the surface of a lithium-manganese oxide. Patent Literature 3 discloses a method of forming a surface treatment layer containing elements such as boron on the surface of a cathode active material such as a lithium-containing metal oxide. Patent Literature 4 discloses a technique of coating the surface of a cathode with alkali metal, alkali earth metal or the like. Patent Literature 5 relates to the invention of adding a coating formation compound having a carbon-carbon unsaturated bond in a molecule and having a single bond or a double bond between 13-group, 14-group or 15-group element M and oxygen (O), thus suppressing a decomposition reaction of electrolytic solution on the cathode. Patent Literature 6 discloses a method of forming a coating layer on the surface of a cathode active material using an amphoteric compound containing zinc or the like.

Additionally, a method for improved storage properties at a high temperature has been found by mixing two types of electrolytes. Patent Literatures 7 to 9 disclose techniques for improved storage properties at a high temperature using electrolytic solution including the mixture of $LiBF_4$ and $LiPF_6$.

CITATION LIST

Patent Literature

Patent Literature 1: JP Patent Publication (Kokai) No. 9-265984 (1997) A
Patent Literature 2: JP Patent Publication (Kokai) No. 2002-175801 A
Patent Literature 3: JP Patent Publication (Kokai) No. 2003-100296 A
Patent Literature 4: JP Patent Publication (Kokai) No. 2003-234102 A
Patent Literature 5: JP Patent Publication (Kokai) No. 2008-146862 A
Patent Literature 6: JP Patent Publication (Kokai) No. 2008-277307 A
Patent Literature 7: JP Patent Publication (Kokai) No. 2000-277146 A
Patent Literature 8: JP Patent Publication (Kokai) No. 2007-280917 A
Patent Literature 9: JP Patent Publication (Kokai) No. 2007-280918 A

SUMMARY OF INVENTION

Technical Problem

It is an object of the present invention to achieve a battery with longer life.

Solution to Problem

In order to solve the aforementioned problems, the present invention relates to a lithium ion secondary battery including a cathode including a cathode active material containing Mn, an anode including an anode active material containing graphite and non-aqueous electrolytic solution, and is based on the finding that a long life lithium ion secondary battery is achieved by electrolytic solution including $LiPF_6$ mainly and adding $LiBF_4$ thereto.

In the lithium ion secondary battery including a cathode including a cathode active material containing Mn, an anode including an anode active material containing graphite and non-aqueous electrolytic solution including electrolyte, $LiBF_4$ and $LiPF_6$ are allowed to coexist. Especially preferably $LiPF_6$ is contained more than $LiBF_4$ in the electrolytic solution. Preferably the electrolytic solution further includes iodide salt. As a result, an oxide of phosphor and boron is deposited on the cathode, thus preventing elution of Mn included in the cathode. The amount of these electrolytes is preferably in the decreasing order of phosphor, boron and then iodine.

Advantageous Effects of Invention

According to the present invention, a longer life lithium ion secondary battery can be obtained. The present application claims priority from Japanese patent application JP 2010-225313, the content of which is hereby incorporated by reference into this application.

DESCRIPTION OF EMBODIMENTS

Figure 1:
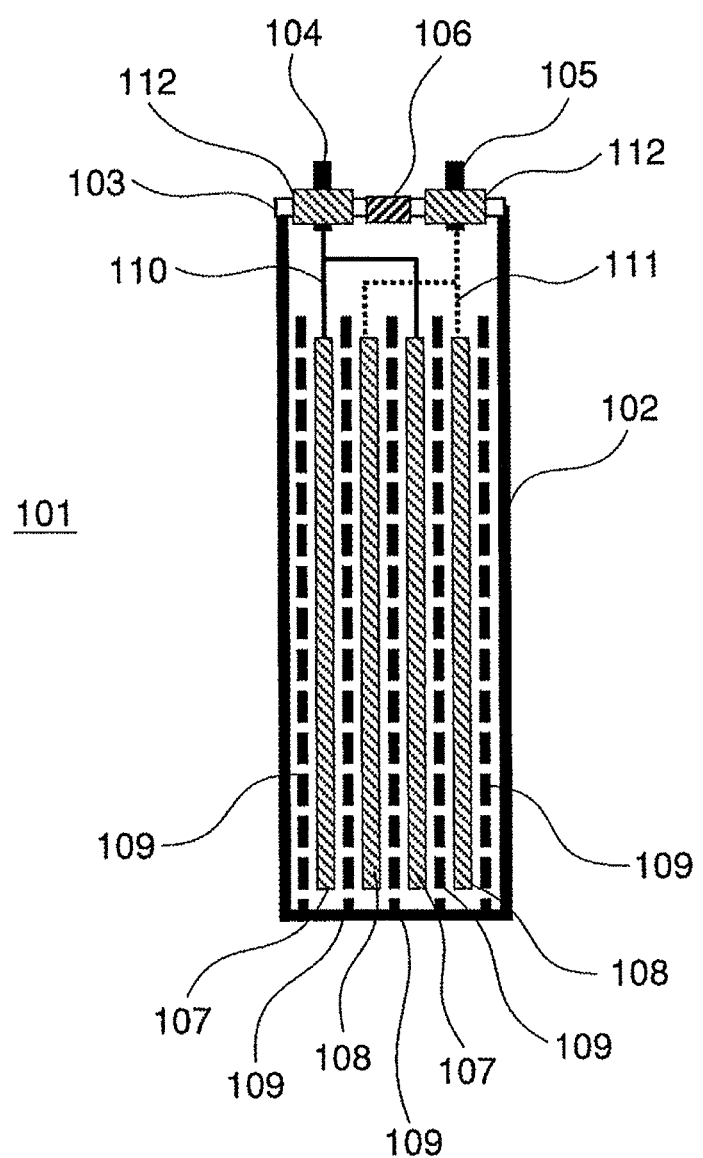
FIG. 1 shows a cross-sectional structure of a lithium ion secondary battery of the present invention.

The following describes the present invention in more details.

Exemplary electric vehicles to which lithium ion secondary batteries are applicable include a zero-emission electric vehicle not including an engine, a hybrid electric vehicle (HEV) including both of an engine and a rechargeable battery as well as a plug-in hybrid electric vehicle (PHEV) enabling direct charge from an electrical grid. Lithium ion secondary batteries are expected for the usage as a fixed electrical power storage system as well, enabling storage of electrical power to supply the electrical power in case of emergency when a power system is shut off.

For the usage as a power supply for a mobile object, a lithium ion secondary battery is required to show output performance of 0.1 C-rate or higher at the time of start/stop. For the usage as a fixed power supply as well, which is for storing backup power for power outage or for load leveling, the output performance thereof is still required to be from 1 C-rate to 0.2 C-rate. Herein, 1 C-rate represents the rate of charge or discharge when the rated capacity of a lithium ion secondary battery is fully used for 1 hour. 0.2 C-rate corresponds to the rate 5 times the current of 1 C-rate, and 0.1 C-rate corresponds to the rate up to 10 times, meaning charge or discharge with such large current.

When a system includes a lithium ion secondary battery having large capacity and output in the early stage but deteriorating greatly in performance, the system cannot continue the operation because of a decrease in the capacity and the output during the course of a subsequent charge/discharge cycle operation and with the passage of time while allowing the battery to stand. For instance, at high temperatures of 50° C. or more, a decomposition reaction of the electrolytic solution progresses on the cathode of the lithium ion secondary battery, and consequently an increase of DC resistance (DCR) of the battery at the cathode and accordingly a decrease of the capacity and the output are confirmed. In this way, it is a big issue to achieve a longer life lithium ion secondary battery for a mobile use such as an electric vehicle or for a fixed use such as electrical power storage.

The present inventors found that the aforementioned elution of Mn can be suppressed by forming an oxide including P and B on the surface of a cathode in a battery including, as electrolytes, both of $LiPF_6$ and $LiBF_4$, thus enabling a longer life lithium ion secondary battery. Further adding a small amount of iodine compound to the electrolytic solution, a still longer life can be achieved. Such a battery with long life can be obtained when the concentration ratio of P and B that is calculated from $LiPF_6$ and $LiBF_4$ in the electrolytic solution (equal to the concentration ratio of $LiPF_6/LiBF_4$) is reversed in the ratio of the surface concentration of P and B in the oxide and especially when the elemental concentration ratio of B/P in the oxide is larger than 1. Using the present invention, a lithium ion secondary battery with long life can be provided.

The following describes the configuration of a lithium ion secondary battery. FIG. 1 schematically shows the internal configuration of a lithium ion secondary battery 101. The lithium ion secondary battery 101 is an electrochemical device enabling storage/usage of electrical energy through occlusion/emission of ions to electrodes in non-aqueous electrolyte. The lithium ion secondary battery 101 of FIG. 1 includes a battery case 102 containing an electrode group made up of a cathode 107, an anode 108 and a separator 109 inserted between these electrodes in a hermetically sealed state. The electrode group may be configured in various forms such as in the lamination form of strip-shaped electrodes as shown in FIG. 1 as well as in a wound-around form into any shape including a cylindrical shape or a flattened shape. The battery case 102 may have a shape that is selected depending on the shape of the electrode group, such as a cylindrical shape, a flattened ellipse shape or a rectangular shape.

A cover 103 is placed at the top of the battery case 102, and the cover 103 is provided with a cathode external terminal 104, an anode external terminal 105 and a liquid injection port 106. After placing the electrode group into the battery case 102, the cover 103 is put on the battery case 102, followed by welding of the outer perimeter of the cover 103 for integration with the battery case 102. The cover 103 may be attached to the battery case 102 by a method caulking or bonding other than welding.

The cathode 107 includes a cathode active material containing Mn, a conducting material, binder and a current collector. The present invention is especially effective for batteries including a cathode active material in which a Mn oxide having a Spinel structure, Mn or oxygen thereof, or a part of an element of lithium is replaced with another element. Since Mn is contained on the surface of the cathode, an oxide layer including boron can be formed stably, and after the formation of a stabilizing film, decomposition of electrolytic solution can be suppressed. In the opinion of the present inventors, this is presumably because an oxide layer including boron is easily formed on a Mn oxide, and these oxides bond strongly.

Typical exemplary cathode active materials that can be used in the present invention include $LiMn_2O_4$ having a Spinel crystal structure, and other examples include $LiMnO_3$, $LiMn_2O_3$, $LiMnO_2$, $Li_4Mn_5O_{12}$, $LiMn_{2-x}M_xO_2$ (wherein M=Co, Ni, Fe, Cr, Zn or Ta, x=0.01~0.2), $Li_2Mn_3Mo_8$ (wherein M=Fe, Co, Ni, Cu or Zn), $Li_{1-x}A_xMn_2O_4$ (wherein A=Mg, B, Al, Fe, Co, Ni, Cr, Zn or Ca, x=0.01~0.1), $LiNi_{1-x}M_xO_2$ (wherein M=Co, Fe or Ga, x=0.01~0.2), $LiFeO_2$, $Fe_2(SO_4)_3$, $LiCo_{1-x}M_xO_2$ (wherein M=Ni, Fe or Mn, x=0.01~0.2), $LiNi_{1-x}M_xO_2$ (wherein M=Mn, Fe, Co, Al, Ga, Ca or Mg, x=0.01~0.2) and $LiMnPO_4$, which may be any cathode active material as long as they have Mn in an oxide state on the surface of the active material particles.

The cathode active material has a particle size that is defined to be the thickness of a mixture layer or less. When coarse particles having a size of the thickness of the mixture layer or more exist in the cathode active material, such coarse particles may be removed beforehand by sieve classification, wind flow classification or the like, thus preparing particles in size of the thickness of the mixture layer or less.

Most of the above-mentioned cathode active materials are oxides and thus have high electrical resistance. As such, they are mixed with a conducting material to supplement their electrical conductivity. Exemplary conducting materials include a carbon material having a high specific surface, such as carbon black or active carbon. In the present invention, presumably an oxide film including boron as a main component is formed on the surface of a cathode due to competitive adsorption of $BF_4$ anions and $PF_6$ anions, and it is more preferable to add a conducting material having a large specific surface of 100 $m^2$/g or more. Another exemplary conducting material includes fibers manufactured by carbonization at a high temperature using vapor-grown carbon or pitch (a by-product of oil, coal, coal tar or the like) as a raw material and conductive fibers such as carbon fibers manufactured from acrylic fibers (polyacrylonitrile). A carbon material with a high specific surface is preferably used with the carbon fibers. The carbon material with a high specific surface auxiliary acts on the conductivity between the cathode active material and the conductive fibers, and thus the conductivity can be further improved than inclusion of the conductive fibers only. Still another exemplary conducting material includes a metal material that is not oxidative dissolved at a charge/discharge potential (typically 2.5 to 4.2 V) and has electrical resistance lower than that of the cathode active material. For instance, anticorrosion metals such as titanium and gold, carbide such as SiC or WC, fibers including nitrides such as $Si_3N_4$ and BN are exemplified. These conducting materials may be manufactured by an existing method such as a melting method or chemical vapor deposition.

As the binder of the cathode, well-known materials such as fluorine binder or rubber binder may be used. An additive (e.g., carboxymethyl cellulose) to adjust dispersibility and viscosity may be added as needed.

As the cathode collector, any collector may be used, which is not limited by materials, shapes, manufacturing methods and the like. Exemplary cathode collectors include aluminum foil of 10 to 100 μm in thickness, perforated aluminum foil of 10 to 100 μm in thickness and of 0.1 to 10 mm in perforation size, expand metal, a foam metal plate and the like. The cathode collector may be made of aluminum as well as stainless steel or titanium.

The cathode active material, the conducting material and the binder are mixed sufficiently with solvent, thus preparing smooth cathode slurry. This slurry is applied to the cathode collector, followed by drying, whereby the cathode 107 is manufactured. After the attachment of the cathode slurry to the collector, the organic solvent is allowed to dry, and the cathode is pressure formed by roll pressing, whereby the cathode can be manufactured. The cathode slurry may be applied by an existing method including, but not limited to, a doctor blade method, dipping or spraying. The procedure from the application to the drying may be performed a plurality of times, whereby a plurality of mixture layers may be formed as a lamination on the collector.

The anode 108 includes an anode active material, binder and a current collector. To embody the present invention, the anode active material is not limited especially, and various materials may be used. Preferable anode active materials include carbon materials having a graphene structure such as graphite, graphitizable carbon and non-graphitizable carbon. That is, carbonaceous materials such as natural graphite, artificial graphite, mesophase carbon, expanded graphite, carbon fiber, vapor-grown carbon fiber, a pitch-based carbonaceous material, needle coke, petroleum coke, polyacrylonitrile-based carbon fiber and carbon black or amorphous carbon materials that are obtained by decomposition by heat of five-membered ring or six-membered ring cyclic hydrocarbon or cyclic oxygenated organic compounds for synthesis can be used, which are materials that can electrochemically occlude/emit lithium ions. A mixture anode made of materials such graphite, graphitizable carbon and non-graphitizable carbon or a mixture anode or a composite anode made of these carbon materials mixed with the aforementioned metal or the aforementioned alloy can implement the present invention without problems. Further, aluminum, silicon, tin or the like can be used instead of the carbon materials.

Since an anode active material typically used is powder, it is desirable to be a particle size of the anode active material of the thickness of a mixture layer or less. When coarse particles having a size of the thickness of the mixture layer or more exist in the anode active material, such coarse particles may be removed beforehand by sieve classification, wind flow classification or the like, thus preparing particles in size of the thickness of the mixture layer or less.

When high-rate charging/discharging is necessary, a conducting material may be added to the anode. Since the conducting material does not contribute to occlusion/emission of lithium ions and acts as a medium of electrons, the conducting material does not affect an occlusion/emission reaction of lithium ions in the anode active material. A conductive high-polymer material made of polyacene, polyparaphenylene, polyaniline or polyacetylene may be used as the anode.

The anode active material is mixed with the binder to bond particles, while bonding the particles to the collector.

As the anode collector, any collector may be used, which is not limited by materials, shapes, manufacturing methods and the like. Exemplary anode collectors include copper foil of 10 to 100 μm in thickness, perforated copper foil of 10 to 100 μm in thickness and of 0.1 to 10 mm in perforation size, expand metal, a foam metal plate and the like. The anode collector may be made of copper as well as stainless steel, titanium or nickel.

Anode slurry obtained by the mixture of the anode active material, the binder and organic solvent is attached to the collector by a doctor blade method, dipping or spraying, followed by drying of the organic solvent, and the anode is pressure formed by roll pressing, whereby the anode can be manufactured. The procedure from the application to the drying may be performed a plurality of times, whereby a multilayered mixture layer may be formed on the collector.

The separator 109 is inserted between the cathode 107 and the anode 108 to prevent short circuit between the cathode 107 and the anode 108. As the separator 109, a polyolefin-based high polymer sheet made of polyethylene, polypropylene or the like may be used. Alternatively, the separator 109 may have a multilayer structure including a fused fluorine-based high polymer sheet typically including polyolefin-based high polymer and polyethylene tetrafluoride. In order not to contract the separator 109 at a high temperature of the battery, a mixture of ceramic and binder may be formed in a thin layer form on the surface of the separator 109. Such a separator 109 has to let lithium ions pass therethrough during charging/discharging of the battery, and thus in general the separator that can be used for the lithium ion secondary battery 101 may have a pore size of 0.01 to 10 μm and porosity of 20 to 90%. The separator 109 is inserted between an electrode disposed at the end of the electrode group and the battery case 102 as well so as to prevent short circuit between the cathode 107 and the anode 108 via the battery case 102. The surfaces of the separator 109 and the electrodes 107, 108 as well as the inside of the pores hold electrolytic solution including electrolyte and non-aqueous solvent.

The electrode group is electrically connected to an external terminal via a lead. The cathode 107 is connected to the cathode external terminal 104 via a cathode lead 110. The anode 108 is connected to the anode external terminal 105 via an anode lead 111. The leads 110 and 111 may have any shape or may be made of any material as long as it is configured to achieve small ohmic loss when a current flows therethrough and is made of a material that does not react with the electrolytic solution. The leads may have any shape and may be made of any material, and may be in a shape such as a foil shape, a wire shape or a plate shape.

At a part of the cathode lead 110 or the anode lead 111, at a connection part between the cathode lead 110 and the cathode external terminal 104 or at a connection part between the anode lead 111 and the anode external terminal 105, a circuit breaker mechanism including a Positive Temperature Coefficient (PTC) resistance element may be provided, whereby when the temperature inside the battery increases, charging/discharging of the lithium ion secondary battery 101 can be stopped to protect the battery.

Between the cathode external terminal 104 or the anode external terminal 105 and the battery case 102, an insulating seal material 112 is inserted so as to prevent short circuit between these terminals. As the insulating seal material 112, a material can be selected from a fluorine resin, a thermosetting resin and a glass hermetic seal, for which any material that does not react with the electrolytic solution and has excellent air tightness can be used.

The battery case 102 may be made of a material that is anti-corrosive in non-aqueous electrolyte, such as aluminum, stainless steel or nickel plate steel. When the battery case 102 is electrically connected to the cathode lead 110 or the anode lead 111, a material of the leads is selected so as not to alter the quality of the material at a part in contact with the non-aqueous electrolyte due to corrosion of the battery case or alloying with lithium ions.

The liquid injection port 106 shown in FIG. 1 is provided at an upper face of the battery case 102. After the electrode group is placed in the battery case 102, followed by hermetic seal, the electrolytic solution of the present invention is dropped through the liquid injection port 106 to fill the battery case 102 with a predetermined amount of the electrolytic solution, and thereafter the liquid injection port 106 is hermetically sealed. The pouring method of the electrolytic solution may be a method of removing the cover 103 from the battery case 102 and directly adding the electrolytic solution to the electrode group, or a method of adding the electrolytic solution through the liquid injection port 106 provided at the cover 103 (FIG. 1). The liquid injection port 106 may be provided with a safety mechanism. As the safety mechanism, a pressure valve may be provided so as to release the pressure inside the battery case.

The non-aqueous electrolytic solution poured into the battery case 102 may include solvent including the mixture of ethylene carbonate with dimethyl carbonate, diethyl carbonate or ethylmethyl carbonate or the like, into which the electrolytes are dissolved. Any type of the solvent may be selected as long as they are not decomposed at the cathode or the anode. The composition thereof also is not limited especially. Exemplary solvents that can be used as the electrolytic solution include non-aqueous solvents such as propylene carbonate, ethylene carbonate, butylene carbonate, vinylene carbonate, γ-butyrolactone, dimethyl carbonate, diethyl carbonate, methylethyl carbonate, 1,2-dimethoxy-ethane, 2-methyltetrahydrofuran, dimethyl sulfoxide, 1,3-dioxolane, formamide, dimethylformamide, methyl propionate, ethyl propionate, trimethyl phosphate, trimethoxymethan, dioxolane, diethyl ether, sulfolane, 3-methyl-2-oxazolidinone, tetrahydrofuran, 1,2-diethoxyethane, chloroethylene carbonate and chloropropylene carbonate, and other solvents may be used.

Solid high-polymer electrolyte (polymer electrolyte) and the electrolytic solution of the present invention are allowed to impregnate to be gel electrolyte, which may be used for the lithium ion secondary battery. Exemplary solid high-polymer electrolyte includes ion conductive polymers made of ethyleneoxid, acrylonitrile, polyvinylidene fluoride, methyl methacrylate and a polyethylene oxide of hexafluoropropylene. Such solid electrolyte is impregnated with the mixture electrolytic solution of $LiPF_6$ and $LiBF_4$. Such a gel electrolyte used leads to an advantageous effect of omitting the separator 109.

As the electrolytes of the lithium ion secondary battery, lithium hexafluorophosphate ($LiPF_6$) and lithium tetrafluoroborate ($LiBF_4$) are used preferably. Especially, a feature of the present invention resides in that the former is used more than the latter. That is, the molar ratio of P/B that is calculated from the molar ratio of the electrolytes is made larger than 1. A part of the electrolyte containing boron is decomposed on the cathode, thus forming an oxide film including boron. Although $LiPF_6$ as well is decomposed on the cathode to form an oxide containing phosphorus, since the decomposition reaction rate of $LiBF_4$ is larger than the decomposition reaction rate of $LiPF_6$, the oxide film containing boron is preferentially formed. This interpretation based on the kinetic evidence is described later with reference to FIG. 3.

The present inventors further found that this oxide film effectively suppresses the decomposition of electrolyte, especially the decomposition of solvent, leading to an improved capacity maintenance rate of the lithium ion secondary battery in a high temperature environment. In order to generate an oxide of boron on the cathode, the electrolyte as a boron source is dissolved. Lithium tetrafluoroborate ($LiBF_4$) is preferable, and other electrolytes containing boron such as lithium bis(oxalate)borate may be used instead, or both of them may be used.

Thus, $LiPF_6$ and $LiBF_4$ are used preferably as the electrolytes. That is, the molar ratio of P/B that is calculated from the molar ratio of the electrolytes is made larger than 1. Since $LiBF_4$ is decomposed more than $LiPF_6$ at the cathode, an oxide film containing boron is preferentially formed on the cathode surface. Therefore, the concentration of $LiBF_4$ is made smaller so that a necessary amount of the oxide film is formed on the cathode surface, and on the other hand the concentration of $LiPF_6$ is made larger so as to increase conductivity of the electrolytic solution. That is, the molar ratio of the electrolytes is set as $LiPF_6/LiBF_4>1$, and particularly preferably the molar concentration of $LiPF_6$ is 0.6 mol/dm$^3$ or more. Lower concentration than this makes dissociated Li+ concentration less, leading to a decrease of conductivity of the electrolytic solution and deterioration of battery performance.

The electrolytic solution preferably includes a compound added thereto that can supply iodine ions. Examples of such additive (electrolyte) include group 1 iodide salts such as lithium iodide, sodium iodide, potassium iodide, rubidium iodide and cesium iodide or group 2 iodide salts such as magnesium iodide, calcium iodide, strontium iodide and barium iodide. The additive is not limited to these exemplified iodide salts, and any salt can be used as long as it dissociates iodine ions and hardly generates a decomposition reaction at the cathode and the anode of a lithium ion secondary battery.

Adding $LiPF_6$ and $LiBF_4$ to the electrolytic solution, ionization reactions in Equations 1 and 3 occur. Subsequently, their respective anions generate decomposition reactions in Equations 2 and 4:

$$LiBF_4 \rightarrow Li^+ + BF_4^- \quad \text{(Equation 1)}$$

$$BF_4^- \rightarrow BF_3 + F^- \quad \text{(Equation 2)}$$

$$LiPF_6 \rightarrow Li^+ + PF_6^- \quad \text{(Equation 3)}$$

$$PF_6^- \rightarrow PF_5 + F^- \quad \text{(Equation 4)}$$

$BF_3$ and $PF_5$ are strong Lewis acid. The equilibrium of the reactions in Equations 2 and 4 lies to the reactant side (left side), and it is considered that the ratio of dissociation of electrolyte anions is very small. The respective equilibrium constants are found as 8.31 (Equation 2) and 9.49 (Equation 4). Based on a comparison between the equilibrium constants of Equation 2 and Equation 4, it can be found that the generation amount of $BF_3$ will be 10 times or more than $PF_5$ (refer to Superacid Chemistry, pp. 44 to 45, Arpadmolnar et al. Wiley InterScience).

The present inventors consider that $BF_3$ is decomposed at the oxide layer on the cathode surface by the following reaction Equation 5, thus forming a film containing boron. Herein, Equation 6 shows a decomposition reaction of $PF_5$ on the surface of the cathode oxide. Presumably, especially when M is a Mn atom, the coating of a boron oxide is easily formed.

$$BF_3 + 3(\text{-O-M-}) \rightarrow B(\text{—O-M-F})_3 \quad \text{(Equation 5)}$$

$$PF_5 + 5(\text{-O-M-}) \rightarrow P(\text{—O-M-F})_5 \quad \text{(Equation 6)}$$

wherein —O-M-shows one unit of a bonding state where an oxygen atom bonds with a metal atom M of the cathode active material. The number preceding (—O-M-) represents six pieces of (—O-M-). —O-M-F means that an oxygen atom bonds with boron, and a metal atom bonds with an oxygen atom and a fluorine atom. Since boron can bond with three oxygen atoms, a subscript 3 is added to (—O-M-F).

Since the ratio of the decomposition reaction of $PF_5$ is governed by the equilibrium constants of Equation 2 and Equation 4, the reaction in Equation 5 easily occurs than in Equation 6 at the rate of 10 times. This means that $LiBF_4$ in the amount of about 1/10 of $LiPF_6$ is added to $LiPF_6$, whereby a film containing a boron oxide can be formed at the ratio equal to or more of a phosphor oxide. The rate of Equation 5 is larger than the rate of Equation 6 by 10 times, which is supported by the below-described Experiment 3.

The present inventors further consider that, in order to promote the reactions of both of Equation 2 and Equation 5, iodine ions are preferably added to the electrolytic solution. $BF_3$ generated in the vicinity of the cathode active material in Equation 2 acts to form a boron-containing film stably in Equation 5. When $BF_3$ reaches a saturation concentration in the electrolytic solution, the reaction rate of Equation 2 becomes small, and so the reaction hardly progresses until $BF_3$ is consumed at the cathode surface. Further, the rate of diffusion of $BF_3$ away from the cathode is limited, and the reaction of Equation 5 may not progress sufficiently. Equations 7 and 8 show reactions in the electrolytic solution containing iodine ions (refer to Canadian Journal of Chemistry, vol. 45, pp. 2403 to 2409, 1967). As a result of Equation 7, $BF_3$ away from the cathode in the electrolytic solution is consumed, and consequently the equilibrium of Equation 2 shifts to the right side, thus promoting generation of $BF_3$. Since $B_2F_7$ is an anion, potential gradient between the cathode and the anode makes it diffused more to the cathode side. When $B_2F_7^-$ reaching the vicinity of the cathode, $BF_3$ is reproduced in accordance with Equation 8, and a boron oxide layer is formed in accordance with Equation 5.

$$7BF_3 + 4I^- \rightarrow 3B_2F_7^- + BI_4^- \quad \text{(Equation 7)}$$

$$3B_2F_7^- \rightarrow 3BF_4^- + 3BF_3 \quad \text{(Equation 8)}$$

As stated above, addition of iodine ions promotes the reaction of Equation 5, so that the generation of a boron oxide easily progresses. Further when $BF_3$ is consumed in accordance with Equation 7, the equilibrium of Equation 2 shifts to the product side (right side), and thus even small amount of iodine ions can act effectively.

The concentration of iodine ions lower than the concentration of $LiBF_4$ can act sufficiently to advance the reaction of Equation 7. The number of moles of iodine ions is preferably the concentration of 1/2 of the number of moles of $BF_3$ or more that is calculated by Equation 7, and desirably is of equal or less of $BF_4^-$.

The aforementioned configurations can be combined as needed, and the specific configuration materials, shapes and components may be changed. Well-known techniques may be added as need or replacement with well-known techniques also is possible.

An electrical power generator using a lithium ion secondary battery of the present invention is applicable to any renewable energy generation system, such as sunlight, geothermal heat or wave energy. Exemplary external equipment that may be combined with the electrical power generator to be a system includes a driving device such as an electric motor. For instance, the usage includes an electric vehicle, a hybrid electric vehicle (HEV), a plug-in hybrid electric vehicle (PHEV), conveying equipment, a constructing machine, care equipment, a light vehicle, an electrical power tool, a game machine, video equipment, a TV, a cleaner, a robot, mobile terminal information equipment and the like. Further usage includes a power storage system attached to photovoltaic power plant, wave power plant, geothermal plant or wind-power plant or a power supply for space station combined with photovoltaic power.

EXAMPLES

The following describes the details by way of examples.

Example 1

Using a Spinel type Mn cathode active material ($Li_{1.05}Mn_{1.95}O_4$) having a high lithium composition and a graphite anode active material, a lithium ion secondary battery was manufactured including a boron oxide film formed on the cathode surface. Components and ratios of the electrolytes were changed so as to examine their effects.

The configuration other than the electrolytes was the same in Examples and Comparative Examples. In Examples, a battery in a shape of FIG. 1 was manufactured. As the cathode, a Spinel type Mn cathode active material ($Li_{1.05}Mn_{1.95}O_4$) having a high lithium composition, carbon black and polyvinylidene fluoride (PVDF (binder)) were used. The cathode material had a composition by weight of 88:5:7. As the anode, artificial graphite was used as an anode active material, to which PVDF was added. The materials had a mixture composition of 92:8 (ratio by weight). The electrolytic solution included solvent that was mixture solvent of ethylene carbonate (EC) and dimethyl carbonate (DMC) with the ratio by volume of 1:2. As the separator, a three-layer microporous structured separator (thickness 25 μm) including polypropylene attached to both faces of polyethylene was used. The electrode group had a lamination structure of the electrodes and the separator, and a rectangular lithium ion secondary battery was manufactured (FIG. 1).

In Battery 1 (Example), the electrolytic solution was prepared by dissolving 0.9 mol/dm³ $LiPF_6$ and 0.1 mol/dm³ $LiBF_4$ in the solvent. In Battery 2 as Comparative Example, the electrolytic solution was prepared by dissolving 1 mol/dm³ $LiPF_6$ in the solvent and not using $LiBF_4$. In Battery 3 as Comparative Example, the electrolytic solution was prepared by dissolving 1 mol/dm³ $LiBF_4$ in the solvent and not using $LiPF_6$. Since the specifications of the batteries including the thicknesses and the widths of the cathodes and the anodes were the same, every battery had a design capacity (i.e., rated capacity) of 10 Ah.

(Experiment 1: Rated Capacity Measurement)

Charging was started to the thus prepared batteries from the state of a open circuit at current (5 A) corresponding to 2 C-rate, and after reaching 4.2 V, constant-voltage charge was performed thereto for 30 minutes. Then after a break for 30 minutes, constant-current discharge was performed at 5 A until the battery voltage reached 3.0V, followed by a break for 30 minutes. This series of cycle was performed three times, thus completing initial aging of the batteries. Through these steps, an oxide film of boron or the like was formed on the cathode surface. Measuring the discharge capacity (rated capacity of the batteries) during the final cycle, Battery 1 showed 10.0 Ah, Battery 2 showed 10.0 Ah and Battery 3 showed 9.5 Ah (Discharge capacity in Table 1).

Since Battery 2 included, as the electrolyte, $LiPF_6$ having excellent conductivity, the initial discharge capacity was the same as that of Battery 1. The rated capacity of Battery 3 decreased by 0.5 Ah compared with other batteries. This is because, due to $LiBF_4$ as the electrolyte, conductivity of the electrolytic solution decreased, and thus internal resistance of the battery increased.

Presumably, Battery 1 included the mixture with $LiBF_4$ as the electrolyte, and the reactivity of $LiBF_4$ was higher than $LiPF_6$ and accordingly $LiBF_4$ was selectively adsorbed to the cathode surface to form a stable oxide film (Equation 2). As a result, using a small amount of $LiBF_4$, an oxide film of B was formed, and the residual $LiPF_6$ increased so that the electrolytic solution kept high conductivity, whereby charge/discharge performance and the rate performance of the battery were improved. In order to achieve this, it is preferable to charge a battery at current lower than conventional or to keep the battery at voltage lower than the rated voltage. Thereby, the decomposition of $LiBF_4$ can be further promoted, so that a stable film can be formed.

(Experiment 2: XPS Observation)

Figure 2:
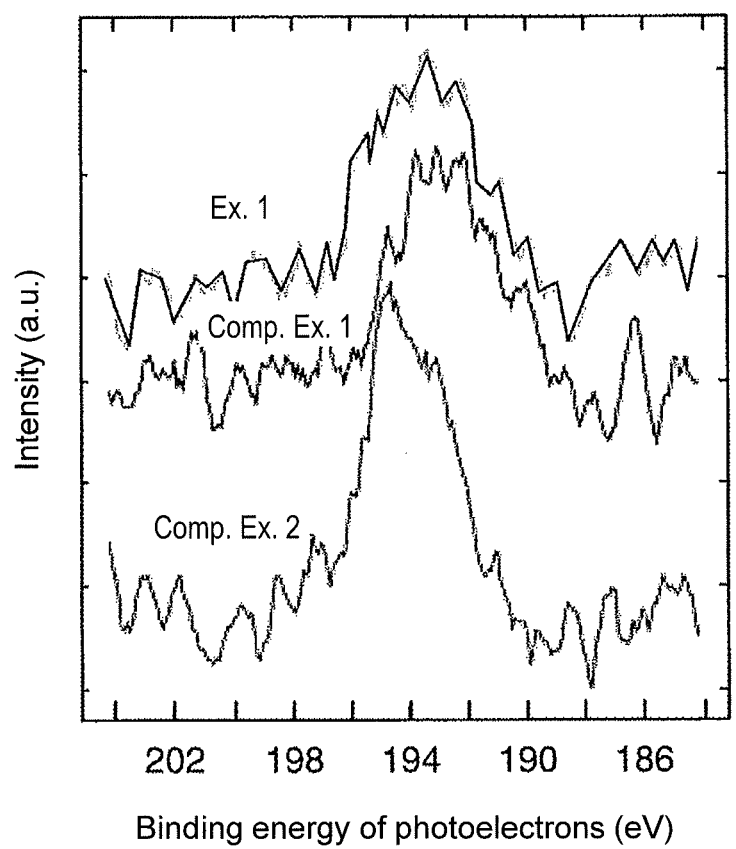
FIG. 2 shows X-ray photoelectron spectra on a cathode surface.

Battery 1 of Example 1, Battery 2 of Comparative Example 1 and Battery 3 of Comparative Example 2 in the discharge state were moved to a glove box filled with argon gas, and then they were disassembled to take the cathodes therefrom. A part of the cathode was immersed in dimethyl carbonate (DMC) to remove the electrolyte sufficiently, and thereafter DMC was allowed to evaporate in the glove box. They were taken out from the glove box, and the surface composition of each cathode was analyzed using X-ray photoelectron spectroscopy (XPS). The XPS spectra are shown in FIG. 2.

was in an oxide state. The peaks of Batteries 2 and 3 shown in FIG. 2 were converted into a shape approximate to normal distribution function, and these peaks were fitted to the spectrum in the lower drawing of FIG. 3. The relative intensities of peaks of Batteries 2 and 3 as Comparative Examples were adjusted so that, when they were overlaid, the peak intensities agreed with the peak intensity of Battery 1 (dotted lines) (so that the calculation converged). In the lower drawing of FIG. 3, the shapes of the peaks in the state of calculation converging are shown with solid lines. From this result, it was found that even when the concentration ratio of $LiBF_4/LiPF_6$ was 1:9, the generation rate of an oxide of B was large at the cathode surface so that the amounts of oxides of B and P were approximately the same. From an experiment, it was found as a fact that the concentration of $LiBF_4$ that was 1/10 of the concentration of $LiPF_6$ yielded approximately the same amount of oxides of B and P. Therefore, presumably, the decomposition rate of $LiBF_4$ was about 10 times the decomposition rate of $LiPF_6$. The analysis result of FIG. 3 suggests that since the equilibrium constants are larger in Equation 2 than Equation 4, the reaction rate of Equation 5 is accelerated more than the reaction rate of Equation 6.

(Experiment 3: Elemental Analysis)

The surface of each cathode was etched with argon ions, and elemental compositions of the top surface layer and elemental compositions after etching were measured. The etching depth was 10 nm in terms of $SiO_2$. Table 1 shows the result.

TABLE 1

| Battery | Electrolyte composition | Discharge capacity after Exp. 1 (Ah) | Elemental concentration ratio (at %) | | | | | | | | | | | |
|---|---|---|---|---|---|---|---|---|---|---|---|---|---|---|
| | | | Etching depth (0 nm) | | | | | | Etching depth (10 nm) | | | | | |
| | | | B | P | C | O | F | Mn | B | P | C | O | F | Mn |
| Battery 1 | Ex. 0.9 mol/dm³ $LiPF_6$, 0.1 mol/dm³ $LiBF_4$ | 10.0 | 0.2 | 0.2 | 33.7 | 24.7 | 24.6 | 1.5 | 0.2 | 0.2 | 34.0 | 16.9 | 23.6 | 7.1 |
| Battery 2 | Comp. Ex. 1.0 mol/dm³ $LiPF_6$ | 10.0 | 0 | 0.7 | 55.5 | 18.6 | 23.9 | 1.3 | 0 | 0 | 57.7 | 15.4 | 13.4 | 13.6 |
| Battery 3 | Comp. Ex. 1.0 mol/dm³ $LiBF_4$ | 9.5 | 3.0 | 0 | 48.4 | 17.6 | 28.5 | 2.5 | 1.4 | 0 | 50.5 | 16.6 | 16.6 | 14.9 |

The XPS spectrum of the cathode in Battery 1 as Example shows a wide band where two peaks (192.3 eV and 194.1 eV) belonging to $P2s$ and $B1s$, respectively, overlap (FIG. 2, Example 1). This result indicates that, in spite of a small ratio of $LiBF_4$ that is 1/10 of $LiPF_6$, oxides of P and B were formed on the cathode surface. This is because the equilibrium constant of Equation 2 is larger than the equilibrium constant of Equation 4.

Figure 3:
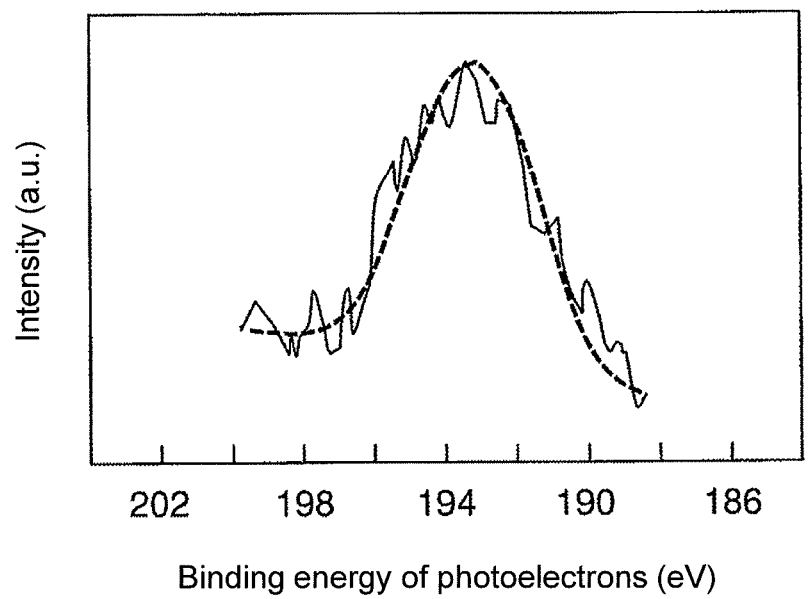
FIG. 3 shows X-ray photoelectron spectra on a cathode surface.
Figure 3:
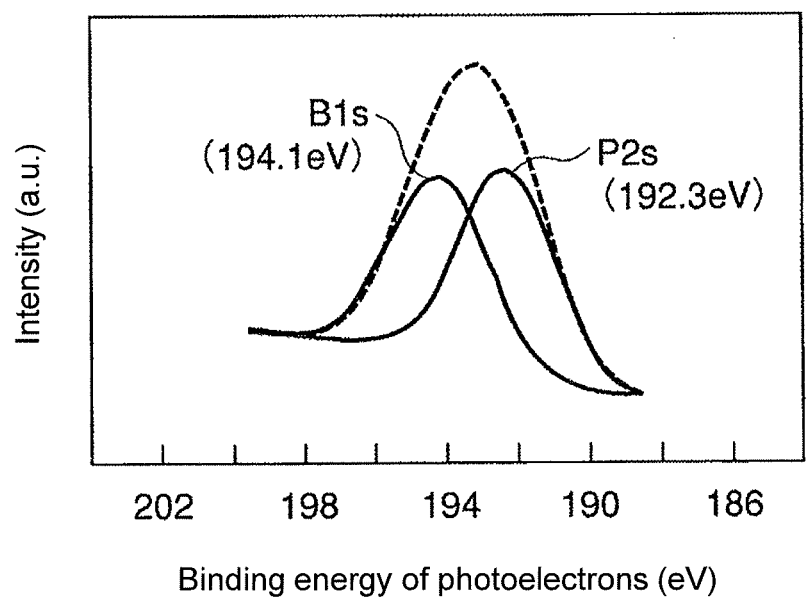

The XPS spectrum that was not isolated in Example 1 was separated so as to clarify $P2s$ derived from a P oxide and $B1s$ derived from a B oxide. The upper drawing in FIG. 3 shows a result of smoothing process performed to the peaks (solid line) of Example 1 in FIG. 2 for conversion into a shape approximate to normal distribution function. A peak subjected to the smoothing processing is shown with dotted lines.

In the XPS spectrum of the cathode in Battery 2, a peak belonging to $P2s$ was observed near 192 eV. It was identified from the value of this binding energy that P was in an oxide state (FIG. 2, Comparative Example 1). In the XPS spectrum of the cathode in Battery 3, a peak belonging to $B1s$ was observed near 194 eV (FIG. 2, Comparative Example 2). It was identified from the value of this binding energy that B In Table 1, the analysis result on the elemental concentration ratio at the etching depth of 0 nm at the cathode of Battery 1 shows that B and P existed in approximately the same amount at the surface of the cathode. The elemental ratio of B and P was determined by the aforementioned method (FIG. 3). Their respective elemental concentrations were 1/10 or more of the Mn surface concentration (1.5 at. %). Since the etching of 10 nm exposed the internal cathode, the XPS peak of Mn increased and the Mn composition increased to 7.1 at. %. This corresponds to removal of the oxide layer containing B, P, C, O and F. Since the concentration of these film constituting elements changed little after etching of 10 nm, the thickness of the oxide layer formed was at least 10 nm and an oxide layer of a few tens nm was probably formed.

In Batteries 2 and 3 as Comparative Examples, an oxide layer of P and an oxide layer of B were observed, respectively. However, their elements were not detected (P composition of Battery 2) or decreased to half (B composition of Battery 3) after etching of 10 nm. On the other hand, the Mn composition increased 6 to 10 times in both of the batteries. From this, it was found that the thickness of these oxide layers was thinner than the oxide layer of Battery 1, and the thickness was about 10 nm.

Comparing the results of the discharge capacity (Experiment 1) and the surface composition analysis (Experiment 3) of Battery 1 with those results of Comparative Examples, it was concluded that, in a desirable embodiment of the present invention, the concentration ratio of boron and phosphor (B/P) contained in an oxide on the cathode is larger than the molar concentration ratio of $LiBF_4$ and $LiPF_6$ ($LiBF_4/LiPF_6$) in the electrolytic solution, and has an inverse relationship. More desirably, B/P in the oxide is larger than 1 and the oxide containing boron is a main component.

Example 2

Types and compositions of the electrolytes were changed as shown in Table 2, and rectangular lithium ion secondary batteries 101 were manufactured in a similar manner to Example 1. In Examples described below, initial aging conditions were changes variously (Experiments 4, 6 and 8) and experiments on high-temperature durability of batteries were conducted (Experiments 5, 7 and 9).

(Experiment 4: Initial Aging by High-Rate Charging)

For batteries having the electrolytic solution compositions as shown in Table 2, after pouring the electrolytic solutions, the cover 103 of each angular battery 101 was welded, immediately followed by charging at high current (10 A) of 1 C-rate. Duration after pouring the electrolytic solution before starting the charging was 30 minutes. For initial aging of the batteries, charging was started to the batteries from the open circuit state with current (10 A) corresponding to 1 C-rate, and after reaching 4.2 V, constant-voltage charge was performed thereto for 30 minutes. The charging duration was about 1 hour. Then after a break for 30 minutes, constant-current discharge was performed at 5 A (corresponding to 2 C-rate) until the battery voltage reached 3.0 V, followed by a break for 30 minutes. This series of cycle was performed three times, thus completing initial aging. The discharge capacity during the final cycle was set as the initial capacity of each battery (rated capacity). The values are shown in the field of Experiment 4 in Table 2.

Even after the initial aging by high-rate charging, the discharge capacity of the battery having the $LiBF_4$ concentration of 0.3 mol/dm³ or less was about 10 Ah, and so a noticeable difference was not found therebetween (Batteries 4, 5, 6, 7 and 8). As the $LiBF_4$ concentration increased, the discharge capacity decreased slightly, and this is due to an influence of the conductivity of the electrolytic solutions. In the case of the $LiBF_4$ concentration increased to 0.5 mol/dm³, however, the discharge capacity after initial aging decreased noticeably (Experiment 4, Battery 9).

(Experiment 5: Experiment on High-Temperature Durability of Batteries After Experiment 4)

After Experiment 4, current during charging and discharging of Batteries 4 to 8 was increased to 10 A, and charge/discharge cycle experiment was performed while holding charge voltage at 4.2 V for 30 minutes, setting the discharge final voltage at 3.0 V, and setting the duration of breaks after charging and after discharging at 30 minutes. The environmental temperature was 50° C. Batteries subjected to 100 cycles were allowed to return to a room temperature, and their discharge capacity was measured in accordance with the conditions of Experiment 1. The result is shown in the field of Experiment 5 in Table 2.

Even in the case of Batteries 5 to 8 of the present invention, the effect from $LiBF_4$ for high-temperature durability was small, and the discharge capacity decreased greatly. This is because the duration after pouring electrolytic solution before starting the initial aging was too short, so that the electrolytic solution did not spread into pores of the cathode sufficiently. This problem was successfully solved by the below-described Experiments 8 and 9.

(Experiment 6: Initial Aging by Low-Current Charging)

Initial aging was performed to Batteries 4 to 9 under the same condition as those in Experiment 1. Similarly to Experiment 1, the current value was set at 5 A corresponding to 0.5 C-rate. Charging was started at 5 A, and after reaching 4.2 V, constant-voltage charge was performed for 30 minutes. The charge duration was about 2.5 hours. Then after a break for 30 minutes, constant-current discharge was performed at 5 A until the battery voltage reached 3.0 V, followed by a break for 30 minutes. This series of cycle was performed three times, thus completing the initial aging. The values of discharge capacity measured finally are shown in the field of Experiment 6 in Table 2.

(Experiment 7: Experiment on High-Temperature Durability of Batteries After Experiment 6)

After Experiment 6, discharge capacity was measured by a method similar to Experiment 5.

Current during charging and discharging was increased to 10 A, and charge/discharge cycle experiment was performed while holding charge voltage at 4.2 V for 30 minutes, setting the discharge final voltage at 3.0 V, and setting the duration of breaks after charging and after discharging at 30 minutes. The environmental temperature was 50° C. Batteries subjected to 100 cycles were allowed to return to a room temperature, and their discharge capacity was measured in accordance with the conditions of Experiment 1. The result is shown in the field of Experiment 7 in Table 2.

TABLE 2

| Battery | $LiBF_4$ concentration (mol/dm³) | $LiPF_6$ concentration (mol/dm³) | Discharge capacity (Ah) | | | | | |
|---|---|---|---|---|---|---|---|---|
| | | | Exp. 4 | Exp. 5 | Exp. 6 | Exp. 7 | Exp. 8 | Exp. 9 |
| 4 (Comp. Ex.) | 0 | 1 | 10.0 | 8.1 | 10.0 | 8.1 | — | — |
| 5 | 0.05 | 0.95 | 10.0 | 8.2 | 10.0 | 8.8 | 10.0 | 9.3 |
| 6 | 0.10 | 0.90 | 9.9 | 8.2 | 9.9 | 9.6 | 9.9 | 9.8 |
| 7 | 0.20 | 0.80 | 9.8 | 8.3 | 9.8 | 9.5 | — | — |
| 8 | 0.30 | 0.70 | 9.7 | 8.3 | 9.7 | 9.1 | — | — |
| 9 (Comp. Ex.) | 0.50 | 0.50 | 8.8 | 8.3 | 8.8 | 8.5 | 8.8 | 8.8 |

The result of Experiment 5 shows that batteries using both of $LiBF_4$ and $LiPF_6$ suppressed decomposition in capacity after 100 cycles. Comparing the results of Experiments 5 and 7, it was found that initial aging under a low-current charge condition to the batteries using both of $LiBF_4$ and $LiPF_6$ can suppress a decrease in capacity after 100 cycles. This was especially effective to the case of the concentration of $LiBF_4$ with reference to the total amount including $LiPF_6$ being 10 to 30%. Presumably, initial aging at low current promotes the elution of boron in the film.

(Experiment 8: Initial Aging Provided with Hold Voltage During Charging)

Using Batteries 5, 6 and 9, their rated capacity was measured while changing the initial aging conditions.

For initial aging of the batteries, charging was started at current (10 A) corresponding to 1 C-rate from the open circuit state, and during charging, the voltage was kept constant at 3.8 V for 30 minutes. This was performed for a confirmation of the effect of improving the method of Experiment 5 from the voltage holding duration provided during charging, while setting the charge current at the same voltage as Experiment 5. Then, charging at current of 10 A was continued until the voltage reached 4.2 V, followed by constant-voltage charge for 30 minutes. The charging duration was about 2 hours, which was longer than about 1 hour of Experiment 4. Then, after a break for 30 minutes, constant-current discharge was performed at 5 A until the battery voltage reached 3.0 V, followed by a break for 30 minutes. This series of cycle was performed three times, thus completing initial aging of the batteries.

Next, charging was started at current (5 A) corresponding to 2 C-rate from the open circuit state, and after reaching 4.2 V, constant-voltage charge was performed for 30 minutes. Then after a break for 30 minutes, constant-current discharge was performed at 5 A until the battery voltage reached 3.0 V, followed by a break for 30 minutes, and the discharge capacity was then measured. The values of discharge capacity measured finally are shown in the field of Experiment 8 in Table 2.

(Experiment 9: Experiment on High-Temperature Durability of Batteries After Experiment 8)

Thereafter, current during charging and discharging was increased to 10 A, and charge/discharge cycle experiment was performed while holding charge voltage at 4.2 V for 30 minutes, setting the discharge final voltage at 3.0 V, and setting the duration of breaks after charging and after discharging at 30 minutes. The environmental temperature was 50° C. Batteries subjected to 100 cycles were allowed to return to a room temperature, and their discharge capacity was measured in accordance with the conditions of Experiment 1. The result is shown in the field of Experiment 9 in Table 2. Even after the cycle experiment performed under the environment at 50° C., the discharge capacity in Experiment 9 tended to be higher than the discharge capacity of the corresponding batteries (Batteries 5A, 6A and 9A) in Experiments 5 and 7 due to the addition of $LiBF_4$.

This hold voltage at 3.8 V, which is lower than the rate voltage (4.2 V), is to let $LiBF_4$ decompose preferentially. As another effect, since the potential at the anode is controlled to be higher during charging at the hold voltage, $F^-$ ions generated in the electrolytic solution are not deposited on the anode in the form of LiF. If a large amount of LiF is formed on the anode surface, diffusion of Li ions will be inhibited. The hold voltage in the range of 3.7 to 4.2 V leads to the effect of improving the capacity maintenance ratio, although there would be a slight difference in the effect.

Example 3

Using both of $LiBF_4$ and $LiPF_6$ as the electrolytes and further adding lithium iodide to the electrolytic solution, rectangular lithium ion secondary batteries 101 were manufactured. The concentrations of the electrolytes and lithium iodide are shown in Table 3. Other conditions were the same as those described in Example 1, and rectangular lithium ion secondary batteries (Battery 10, Battery 11 and Battery 12) were manufactured.

In order to clarify the effect from lithium iodide added on the initial capacity and high-temperature durability, two types of initial aging conditions of Experiments 6 and 8 were used. Finally measured discharge capacity under these conditions was set as the initial capacity (rated capacity), which are shown in the fields of Experiment 6 and Experiment 8 in Table 3.

TABLE 3

| Battery | $LiBF_4$ concentration (mol/dm³) | $LiPF_6$ concentration (mol/dm³) | Li concentration (mol/dm³) | Discharge capacity (Ah) | | | |
|---|---|---|---|---|---|---|---|
| | | | | Exp. 6 | Exp. 7 | Exp. 8 | Exp. 9 |
| 10 | 0.005 | 1.00 | 0.005 | 10.0 | 8.5 | 10.0 | 8.8 |
| 11 | 0.010 | 0.99 | 0.010 | 10.0 | 8.6 | 10.0 | 9.1 |
| 12 | 0.050 | 0.95 | 0.050 | 10.0 | 8.7 | 10.0 | 9.2 |

Thereafter, high-temperature durability experiment was conducted to the batteries subjected to Experiment 6 under the same conditions as in Experiment 7. The environmental temperature was 50° C. Discharge capacity of batteries subjected to 100 cycles was measured at a room temperature, and their measurement values are shown in the field of Experiment 7 in Table 3.

Similarly, high-temperature durability experiment was conducted to the batteries subjected to Experiment 8 under the same conditions as in Experiment 9, and discharge capacity of batteries subjected to 100 cycles was measured at a room temperature. Their measurement values are shown in the field of Experiment 9 in Table 3.

It was found that the batteries including lithium iodide added thereto, even including a small amount of $LiBF_4$ than in Examples 5 to 8 of Table 2, had large initial capacity and improved high-temperature durability. Further, even under different initial aging conditions (Experiments 6 and 8), the same initial capacity was obtained, and substantially similar high-temperature durability was obtained as well, although the initial aging in Experiment 8 yielded better result (Experiments 7 and 9).

Presumably, such effects from lithium iodide added result from the film of boron that is easily formed even in the case of small concentration of LiBF$_4$ (Equations 7 and 8), thus suppressing a decrease in battery capacity. In this way, the addition ratio of LiBF$_4$ used as the electrolyte can be made small, e.g., 0.05 mol/dm$^3$ or less. That is, it is clear from Table 3 that lithium iodide effectively acts as long as the amount of iodide salt is in the range of 0.5% to 5% with reference to the total amount of the iodide salt and the aforementioned LiBF$_4$ and LiPF$_6$. Further since small amount of lithium iodide that can shift the equilibrium reaction to the product side in Equations 7 and 8 acts sufficiently, the additive amount of lithium iodide may be that of LiBF$_4$ or less.

Example 4

In this example, the conducting material was changed partly. The cathode was manufactured by decreasing acetylene black by 1% in the cathode composition of Example 1 and adding active carbon of 100 m$^2$/g or 1,000 m$^2$/g in specific surface. The anode and the electrolytic solution were not changed, and rectangular lithium ion secondary batteries of FIG. 1 were manufactured. The battery including active carbon of 100 m$^2$/g in specific surface was Battery 13 and the battery including active carbon of 1,000 m$^2$/g in specific surface was Battery 14.

For initial aging of the batteries, charging was started from the open circuit state with current (5 A) corresponding to 2 C-rate, and after reaching 4.2 V, constant-voltage charge was performed for 30 minutes. Then after a break for 30 minutes, constant-current discharge was performed at 5 A until the battery voltage reached 3.0 V, followed by a break for 30 minutes. This series of cycle was performed three times, thus completing initial aging. The discharge capacity during the final cycle was 10±0.1 Ah for both of Batteries 13 and 14, which was capacity as designed, and thus 10 Ah was set as the rated capacity of the batteries.

These batteries underwent the high-temperature durability experiment described in Experiment 7. After 100 cycles, Batteries 13 and 14 were allowed to return to a room temperature, and then capacity measurement experiment in Experiment 1 was performed. As a result, high discharge capacity of 9.5±0.2 Ah was obtained. Presumably this is because active carbon increased the holding amount of the electrolytic solution containing LiBF$_4$ in the cathode, which contributed to stable film formation on the cathode.

Example 5

Figure 4:
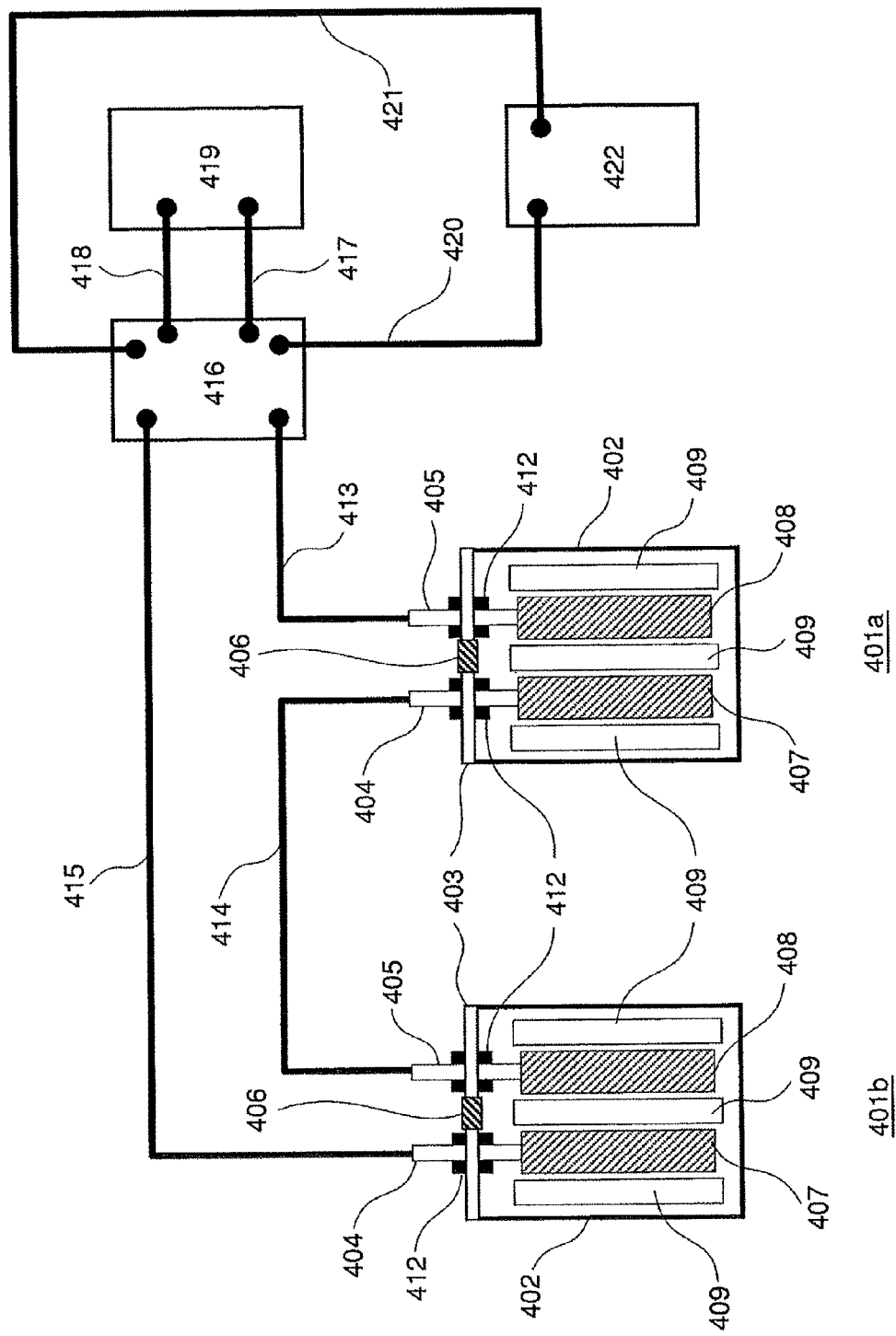
FIG. 4 shows a battery system of the present invention.

FIG. 4 shows a battery system of the present invention including two lithium ion secondary batteries 401$a$ and 401$b$ connected in series. This system is called S1. These lithium ion secondary batteries 401$a$ and 401$b$ are rectangular lithium ion secondary batteries having the same specifications as those of Example 1, and have capacity of 10 Ah under the 1-C rate discharging condition.

The lithium ion secondary batteries 401$a$ and 401$b$ include electrode groups having the same specifications and each including a cathode 407, an anode 408 and a separator 409, and are provided with a cathode external terminal 404 and an anode external terminal 405 at their top. Between these external terminals and a cover 403 of the battery, an insulating seal material 412 is inserted so as to prevent short circuit between the external terminals. Note here that although FIG. 4 omits components corresponding to the cathode lead 110 and the anode lead 111 of FIG. 1, the lithium ion secondary batteries 401$a$ and 401$b$ have an internal structure similar to FIG. 1. Electrolytic solution is supplied through a liquid injection port 406 provided at the cover 403 of the battery.

The anode external terminal 405 of the lithium ion secondary battery 401$a$ is connected to an anode input terminal of a charge/discharge controller 416 via a power cable 413. The cathode external terminal 404 of the lithium ion secondary battery 401$a$ is connected to the anode external terminal 405 of the lithium ion secondary battery 401$b$ via a power cable 414. The cathode external terminal 404 of the lithium ion secondary battery 401$b$ is connected to a cathode input terminal of the charge/discharge controller 416 via a power cable 415. With such a wiring arrangement, the two lithium ion secondary batteries 401$a$ and 401$b$ can be charged or be discharged. The number of batteries connected in series or in parallel may be any number depending on the electrical power required for System S1.

The charge/discharge controller 416 exchanges electric power with equipment 419 (hereinafter called external equipment) provided externally via power cables 417 and 418. Exemplary external equipment 419 includes an external power supply to feed electricity to the charge/discharge controller 416 or various electrical equipment such as a regenerative motor as well as an inverter, a converter or a load to which the present system supplies electrical power. Depending on the types of the external equipment whether AC or DC, an inverter or the like may be provided. Any well-known equipment may be used for such equipment.

An electrical power generator 422 is further provided as equipment generating renewable energy, the electrical power generator 422 being operated under simulated operating conditions of an aerogenerator, and the electrical power generator 422 is connected to the charge/discharge controller 416 via power cables 420 and 421. When the electrical power generator 422 generates power, the charge/discharge controller 416 shifts to a charge mode so as to supply electricity to the external equipment 419 while charging the lithium ion secondary batteries 412$a$ and 412$b$ with surplus power. When the amount of generated power that is simulation of an aerogenerator is less than the required power from the external equipment 419, the charge/discharge controller 416 operates so as to let the lithium ion secondary batteries 412$a$ and 412$b$ discharge. The electrical power generator 422 may be replaced with any another electrical power generator such as a solar battery, a geothermal power generator, a fuel cell or a gas turbine generator. The charge/discharge controller 416 may store an automatic operative program therein so as to operate as stated above.

The lithium ion secondary batteries 401$a$ and 401$b$ are charged normally to achieve their rated capacity. For instance, constant-voltage charging of 4.1 V or 4.2 V may be executed at charge current of 1 C-rate for 0.5 hour. Since the charge conditions may be decided in accordance with design such as types and usage amounts of materials of the lithium ion secondary batteries, optimum conditions may be set for the specifications of the battery.

After charging of the lithium ion secondary batteries 401$a$ and 401$b$, the charge/discharge controller 416 is switched to a discharge mode, so as to let the batteries discharge. Typically, discharge is stopped when they reach a constant lower limit voltage.

Using the thus described system, electric power is supplied to the external equipment 419 during charging and the electric power therein is consumed during discharging. In the present example, discharging up to 5 C-rate was conducted, from which high capacity of 90% of the capacity during discharging at 1 C-rate was obtained. During power generation by the electrical power generator 422 simulating an aerogenerator, charge at 3 C-rate was successfully performed. The external equipment 419 may be an electrical motor, for example. The present example can be applied to equipment using the electrical motor, including an electric vehicle, a hybrid electric vehicle (HEV), conveying equipment, constructing machine, care equipment, a light vehicle, an electrical power tool, a game machine, video equipment, a TV, a cleaner, a robot, mobile terminal information equipment and the like. Further usage includes a power storage system attached to photovoltaic power plant, wave power plant, geothermal plant or wind-power plant or a power supply for space station combined with photovoltaic power.

REFERENCE SIGNS LIST 101, 401a, 401b lithium ion secondary battery
102, 402 battery case
103, 403 cover
104, 404 cathode external terminal
105, 405 anode external terminal
106, 406 liquid injection port
107, 407 cathode
108, 408 anode
109, 409 separator
110 cathode lead
111 anode lead
112, 412 insulating seal material
413, 414, 415, 417, 418, 420, 421 power cable
416 charge/discharge controller
419 external equipment
422 electrical power generator of renewable energy

The invention claimed is:

1. A lithium ion secondary battery, comprising a cathode including a cathode active material containing Mn, an anode including an anode active material containing graphite and non-aqueous electrolytic solution including electrolyte, wherein
the electrolytic solution contains $LiBF_4$ and $LiPF_6$, and $LiPF_6$ is contained more than $LiBF_4$ in the electrolytic solution,
a concentration of the $LiBF_4$ is 10 to 30% with reference to a total amount including the $LiPF_6$,
an oxide containing phosphor and boron is formed on the cathode, and
a concentration ratio (B/P) of boron and phosphor included in the oxide on the cathode is larger than a molar concentration ratio ($LiBF_4/LiPF_6$) of $LiBF_4$ and $LiPF_6$ in the electrolytic solution.

2. The lithium ion secondary battery according to claim 1, wherein the electrolytic solution further includes iodide salt, and an amount of the iodide salt is equal to or less than the amount of the $LiBF_4$.

3. The lithium ion secondary battery according to claim 2, wherein the amount of the iodide salt is 0.5% to 5% with reference a total amount of the iodide salt, the $LiBF_4$ and the $LiPF_6$.

4. The lithium ion secondary battery according to claim 3, wherein the amount of the $LiBF_4$ is 0.5% to 30% with reference a total amount of the iodide salt, the $LiBF_4$ and the $LiPF_6$.

5. The lithium ion secondary battery according to claim 1, wherein an atomic ratio (B/P value) of boron and phosphor that is obtained by measurement of a surface of the cathode in an early stage by X-ray photoelectron spectroscopy (XPS) is larger than an atomic ratio (B/P value) of boron and phosphor that is obtained by measurement of the surface of the cathode subjected to a charge/discharge cycle at constant current of 2 C-rate or lower while being immersed in electrolytic solution including $LiPF_6$ and $LiBF_4$.

6. The lithium ion secondary battery according to claim 1, wherein the cathode includes a conducting material, and the conducting material has specific surface of 100 $m^2/g$ or more.

7. The lithium ion secondary battery according to claim 1, wherein the lithium ion secondary battery undergoes initial aging processing including a charge/discharge cycle having predetermined duration to hold voltage lower than rated charge voltage.

8. A system including the lithium ion secondary battery according to claim 1.

9. The lithium ion secondary battery according to claim 2, wherein an atomic ratio (B/P value) of boron and phosphor that is obtained by measurement of a surface of the cathode in an early stage by X-ray photoelectron spectroscopy (XPS) is larger than an atomic ratio (B/P value) of boron and phosphor that is obtained by measurement of the surface of the cathode subjected to a charge/discharge cycle at constant current of 2 C-rate or lower while being immersed in electrolytic solution including $LiPF_6$ and $LiBF_4$.

10. The lithium ion secondary battery according to claim 2, wherein the cathode includes a conducting material, and the conducting material has specific surface of 100 $m^2/g$ or more.

11. The lithium ion secondary battery according to claim 2, wherein the lithium ion secondary battery undergoes initial aging processing including a charge/discharge cycle having predetermined duration to hold voltage lower than rated charge voltage.

12. A system including the lithium ion secondary battery according to claim 2.

* * * * *